(12) United States Patent
Maile et al.

(10) Patent No.: US 7,744,448 B2
(45) Date of Patent: Jun. 29, 2010

(54) TEMPERATURE CONTROL OF THE MASS FLOW IN A FILLING MACHINE

(75) Inventors: Bernd Maile, Oggelshausen (DE); Peter Willburger, Baindt (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 104 days.

(21) Appl. No.: 12/109,509

(22) Filed: Apr. 25, 2008

(65) Prior Publication Data

US 2008/0299885 A1 Dec. 4, 2008

(30) Foreign Application Priority Data

May 29, 2007 (EP) .................. 07010627

(51) Int. Cl.
 *A22C 11/00* (2006.01)
(52) U.S. Cl. .................................... 452/31
(58) Field of Classification Search ............ 452/21–27, 452/30–35, 37–39, 46, 51
 See application file for complete search history.

(56) References Cited

U.S. PATENT DOCUMENTS

| | | | | |
|---|---|---|---|---|
| 3,870,585 A | * | 3/1975 | Kearns et al. ............... | 159/4.02 |
| 4,296,072 A | * | 10/1981 | Takacs et al. ............... | 422/254 |
| 5,073,141 A | * | 12/1991 | Lemmer ...................... | 452/30 |
| 5,470,519 A | * | 11/1995 | Markulin ..................... | 264/193 |
| 5,605,502 A | * | 2/1997 | Christensen ................. | 452/30 |
| 5,709,599 A | * | 1/1998 | Christensen ................. | 452/34 |
| 6,632,466 B2 | * | 10/2003 | Roussel et al. .............. | 426/516 |
| 6,740,349 B2 | * | 5/2004 | Franklin et al. ............. | 426/513 |
| 6,797,100 B1 | * | 9/2004 | Gord et al. .................. | 156/156 |
| 6,989,170 B2 | * | 1/2006 | Konanayakam et al. ..... | 426/243 |
| 7,040,974 B2 | * | 5/2006 | Shefet ......................... | 452/35 |
| 7,464,564 B2 | * | 12/2008 | Whiteside et al. ............ | 62/342 |
| 2002/0075754 A1 | | 6/2002 | Huber et al. | |

FOREIGN PATENT DOCUMENTS

| | | |
|---|---|---|
| DE | 11 59 803 B | 12/1963 |
| DE | 39 15 409 A1 | 11/1990 |
| DE | 10 2005 032678 A1 | 1/2007 |

OTHER PUBLICATIONS

European Search Report; Dated Jun. 29, 2007; based on European Patent Application No. EP 07 01 0627.

* cited by examiner

*Primary Examiner*—Thomas Price
(74) *Attorney, Agent, or Firm*—Marshall, Gerstein & Borun LLP

(57) ABSTRACT

A method and a filling machine for the temperature control of a mass flow in a filling machine, wherein the mass flow passes through several sections. In order to also process temperature-sensitive types of filling material reliably with the minimum outlay, the temperature of the filling material is measured in several sections of the filling machine and the temperature of the filling material is controlled by a heating/cooling device to a certain temperature in dependence of the measured temperatures.

23 Claims, 4 Drawing Sheets

TEMPERATURE CONTROL OF THE MASS FLOW IN A FILLING MACHINE

CROSS REFERENCE TO RELATED APPLICATION

The present application claims the benefit of priority of European Patent Application No. EP 07010627.3, filed May 29, 2008.The entire text of the priority application is incorporated herein by reference in its entirety.

FIELD OF THE DISCLOSURE

The disclosure relates to a method and a filling machine, such as used in sausage-making operations.

BACKGROUND

Filling machines of this nature for filling sausage casings with paste material are already known. During the processing of certain types of filling material, e.g. raw sausage, it should be ensured that the temperature of the filling material does not undercut or exceed a certain temperature in the complete processing chain. If the filling material undercuts or exceeds a certain temperature, it cannot then be processed further. For this reason currently the temperature of the mass flow is acquired, wherein on reaching a certain limit the operator must intervene actively and manually in the process. With heated hoppers the intervention can take place as long as filling material is located in them. Production may even need to be interrupted and the filling material removed from the machine, because it can no longer be processed. The ejection of the filling material from the machine or the cleaning of the machine requires however a high outlay and is correspondingly cost-intensive. The known filling machines therefore demand predictive actions. Consequently, increased concentration is required of the operator.

SUMMARY OF THE DISCLOSURE

Based on this the object of the disclosure is to process also temperature sensitive types of filling material with the minimum of outlay.

Due to the fact that the temperature of the mass is measured in several sections of the filling machine, the temperature of the mass flow can be monitored, controlled and optimised during the complete dwell period within the machine. Since several sections are difficult to access with temperature measurement, the temperature can also be indirectly measured. In this case the temperature of the components through which the mass flows is measured. Thus, temperature effects, to which the filling material is subjected during production, can be effectively compensated. This means that also temperature effects, such as heat dissipated from the filling machine, internal friction of the mass, which occurs in particular in the conveying mechanism, or also the temperature effect due to the room temperature can be easily dealt with. The operator no longer needs to act with foresight and furthermore no longer has to intervene in the process, which relieves the operating personnel substantially. The process reliability is increased and furthermore higher machine capacity is obtained through less downtime.

With the process according to the disclosure the mass flow, that is the flow of filling material, which passes through a suction intake section, filling hopper, conveying mechanism and a filling tube and is ejected from the filling tube, can be controlled to a certain temperature. The method according to the disclosure can however similarly be used for a coextrusion mass flow.

In an advantageous way the temperature is measured at least in a section of the filling hopper or of the suction intake section and in or after the conveying mechanism. The suction intake section here signifies for example the suction tube or also a preceding container, such as for example a floor-mounted hopper. Thus, the temperature control can successfully start already with the entrance of the mass in the filling machine. If the temperature is additionally measured in or after the conveying mechanism, then temperature effects as a result of internal friction are also reliably acquired and can then be well compensated. After the conveying mechanism signifies for example in sections which follow on from the conveying mechanism outlet, such as for example a meat mincing machine (e.g. mincer attachment) or filling tube.

According to the disclosure the temperature cannot only be acquired in certain sections, but rather controlled to a certain value in one or several sections of the filling machine using an appropriate heating/cooling device. Thus, the target temperature of the mass flow can be maintained in an ideal manner without large variations. In this way the process reliability is further increased. In particular, the temperature of the mass in or at the hopper and/or at the conveying mechanism and/or at a meat mincing machine and/or at the filling tube and/or in or at the suction intake section can be controlled with the aid of the heating/cooling device.

It is also possible that, depending on the measured temperatures in the filling machine, the mass is set to a certain temperature before it is passed to the filling machine, in particular during the preparation of the paste mass. Thus, the mass or the filling material can exhibit an appropriately suitable temperature before it reaches the filling machine, so that the heating/cooling device of the filling machine can control the temperature to the appropriate target value. This has the advantage that the heating/cooling device directly in the filling machine can have a lower maximum power and be of smaller size.

According to the disclosure the temperature control in the individual sections can occur through a common heating/cooling circuit or through at least two separate heating/cooling circuits. A common heating/cooling circuit has a more simple construction. A separate heating/cooling circuit, i.e. individual heating/cooling circuits for different sections, facilitates however a still more precise control of the mass temperature in the various sections. Thus, for example, the mass in the conveying mechanism, where it is subject to greater internal friction and takes up more dissipated heat from the machine, can be cooled more than, for example, at the filling tube or in the hopper.

It is possible that the temperature control occurs predictively in dependence of the expected or measured mass flow rate, wherein the cooling or heating power from the heating/cooling device is controlled depending on the flow rate. Here, the flow rate can be measured or entered. This means that, for example, with high flow rates at the beginning of the process the heating or cooling power of the heating/cooling device is set initially higher than for low flow rates in order to ensure an adequate temperature control of the mass already at the start of the process. Similarly, it is possible that the temperature control occurs predictively in dependence of the expected or measured mass pressure, wherein the cooling or heating power from the heating/cooling device is controlled depending on the mass pressure. The mass pressure is the pressure of the mass produced in the conveying mechanism. At a high mass pressure the product heats up more significantly than at low mass pressure, which can be compensated by appropriate control of the heating/cooling device. Similarly, it is possible that the temperature control is realised predictively in dependence of the expected or measured power consumption of the filling machine, wherein the cooling or heating power from the heating/cooling device is controlled depending on the expected or measured power consumption.

If with the method according to the disclosure a coextrusion device is additionally provided and the mass flow, the temperature of which is to be controlled, is a coextrusion mass flow, the temperature is measured in a section of a coextrusion mass intake, for example a coextrusion hopper and/or in a section of a coextrusion conveying mechanism and/or in a section of a coextrusion head. The temperature of the mass can then also be controlled at least in one of these sections using a heating/cooling device. Thus, the mass flow of the coextrusion mass can also be processed reliably, as previously described.

The disclosure facilitates the documentation of the temperatures with respect to time and location. A log of this nature increases the process reliability and furthermore facilitates verification that appropriately prescribed temperatures are maintained.

A filling machine according to the disclosure comprises several temperature sensors which are arranged in various sections of the filling machine, and a heating/cooling device for heating or cooling the mass, and a control device, which controls the temperature of the mass in dependence of the measured temperatures. Optionally, the temperature can also be controlled in dependence of an expected temperature. In this case the heating/cooling device can be arranged at least partially on the filling hopper and/or the conveying mechanism and/or the filling tube and/or at the suction intake section. If the filling machine also comprises a mincer attachment or a meat mincing machine, the heating/cooling device can also be arranged here at least partially. This enables the temperature to be controlled in various sections. In an advantageous way the temperature sensors are arranged at least in a section of the filling hopper or of the suction intake section and in or after the conveying mechanism. The heating/cooling device of the filling machine, which heats or cools at several sections, can have a common cooling or heating circuit for these sections. The heating/cooling device can also have several independent units with separate cooling or heating circuits.

According to a preferred embodiment the device comprises a coextrusion device, which has several sections, such as a coextrusion mass intake, a conveying mechanism and a coextrusion head, wherein the temperature sensors are then arranged in several sections of the coextrusion device. Thus, the coextrusion mass flow can also be controlled, as previously described, precisely to a certain temperature, wherein the various influences in the various sections of the coextrusion device can be taken into account. The heating/cooling device can then also be arranged in at least one section of the coextrusion device.

Furthermore, the filling machine according to the disclosure preferably comprises a device for documenting the measured temperatures with respect to time and location.

Furthermore, it is then possible according to the disclosure to include temperatures, which are measured in a certain section or sections, also for the temperature control in a different section or different sections. Thus, predictive temperature control is possible which takes into account the various temperature effects in the various sections.

BRIEF DESCRIPTION OF THE DRAWINGS

The disclosure is explained in more detail in the following with reference to the following figures.

DETAILED DESCRIPTION OF THE DISCLOSURE

Figure 1:
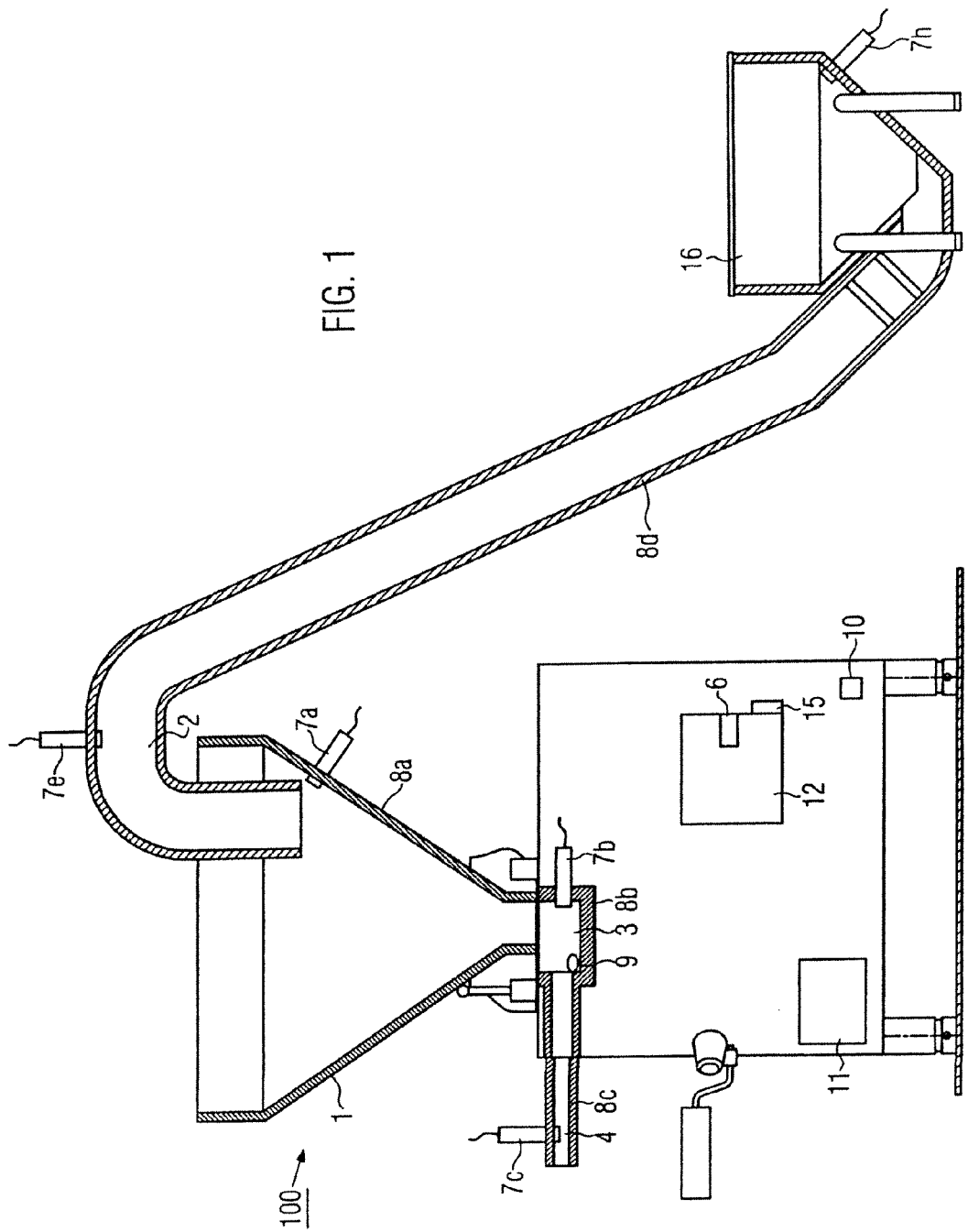
FIG. 1 shows schematically an embodiment of a filling machine according to the disclosure.

FIG. 1 illustrates an embodiment of a filling machine 100 according to the disclosure. The filling machine 100 comprises a filling hopper 1, for example a vacuum hopper, in which a negative pressure can be produced. Furthermore, the filling machine 100 comprises a suction pipe 2, through which the paste mass, also designated as filling material in the following, can be passed into the filling hopper 1. The suction pipe 2 is part of a suction intake section for the filling material. A preceding floor-mounted hopper 16 can also be included in the suction intake section. Furthermore, the filling machine also comprises a conveying mechanism 3, which is arranged at the lower end of the conically shaped filling hopper 1. In a familiar manner a conveying mechanism 3 of this type comprises, for example, a vane pump or a screw conveyor, which pushes the filling material out of the filling hopper 1 in the direction of a filling tube 4, wherein the filling material is pushed into a sausage casing via the filling tube 4.

The filling machine 100 according to the disclosure has accordingly several sections, i.e. the previously described suction intake section 2, the filling hopper 1, the conveying mechanism 3 and a section, such as for example a filling tube 4, arranged following the conveying mechanism 3.

Figure 2:
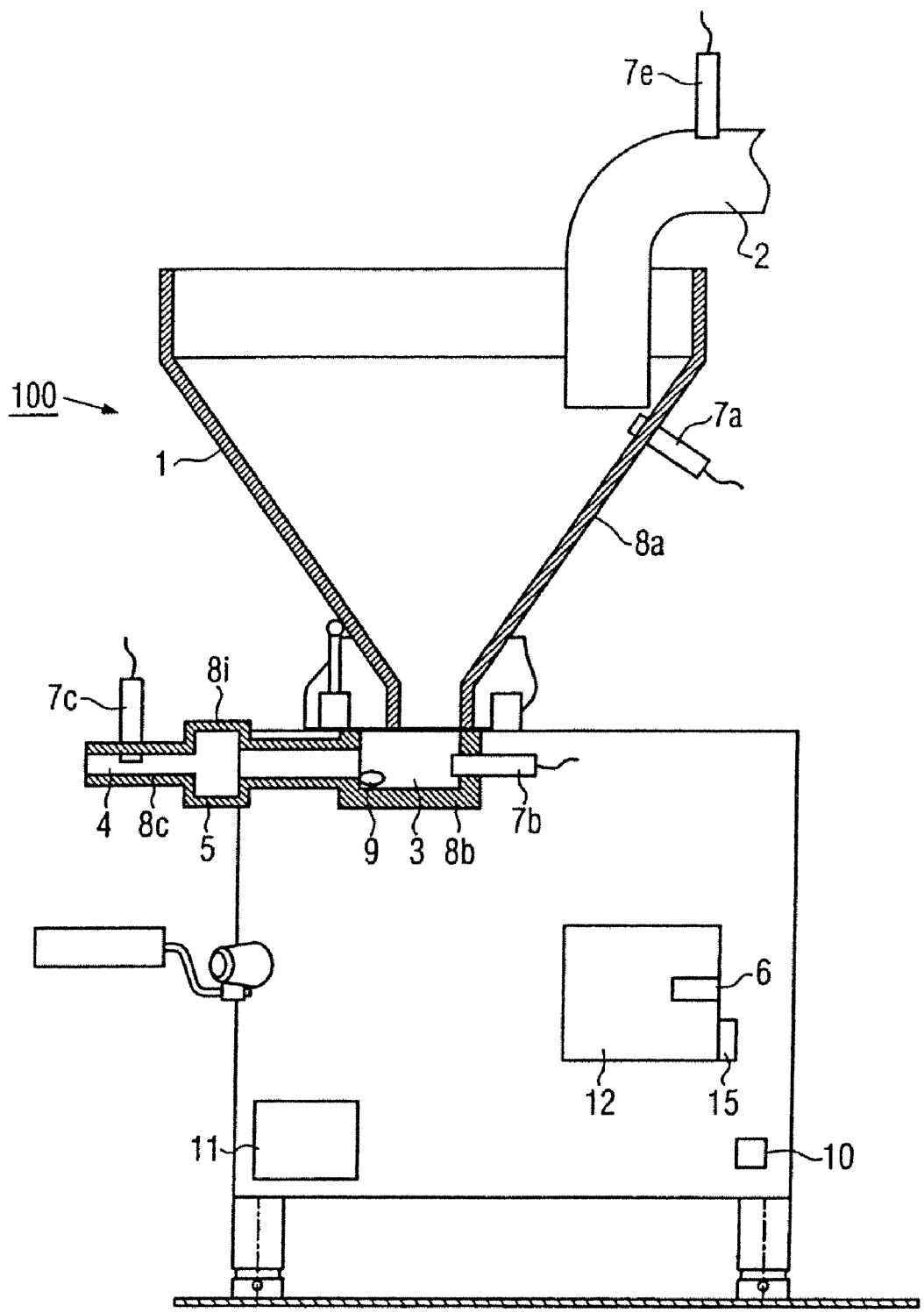
FIG. 2 shows schematically a filling machine according to a further embodiment of this disclosure.

The embodiment illustrated in FIG. 2 corresponds to the embodiment illustrated in FIG. 1, wherein however a meat mincing machine 5 is arranged at the conveying mechanism outlet, and for the sake of clarity the suction intake section is not illustrated.

According to the disclosure, temperature sensors 7 are provided in several sections of the filling machine 100. In FIG. 1 for example a temperature sensor 7a is arranged in the upper section of the filling hopper 1 and there is a further temperature sensor 7b, which measures the temperature of the filling material in the conveying mechanism 3, as well as a temperature sensor 7c, which here measures the temperature of the filling material in the filling tube 4.

As emerges from FIGS. 1 and 2, alternatively or additionally the temperature can also be measured by appropriate temperature sensors 7e, 7h in the suction intake section 2 of the filling hopper 1, e.g. in the suction pipe 2 or in the floor-mounted hopper 16. Although not illustrated, the temperature could also be measured in the meat mincing machine 5.

Moreover, the filling machine according to the disclosure comprises a heating/cooling device 8, which enables the filling material temperature to be closed-loop controlled to a certain target value or target value range. The heating/cooling device 8 is arranged in several sections of the filling machine 100. With the embodiment illustrated in FIG. 1 a part 8a of the heating/cooling device is arranged around the filling hopper 1, i.e. around its outer wall. A part 8b of the heating/cooling device is arranged such that it cools the filling material in the conveying mechanism 3. Moreover, a part 8c of the heating/cooling device is arranged on the filling tube 4 so that the filling material in the filling tube 4 can be heated or cooled. Moreover, a heating/cooling device 8d is arranged in the suction intake section, i.e. around the suction pipe and/or the floor-mounted hopper 16. Preferably, the heating/cooling device 8 is provided on at least two sections.

The heating/cooling device 8 is formed as a heat exchanger, e.g. a continuous-flow heat exchanger, and also comprises a corresponding heating or refrigeration set 11.

If, as illustrated in FIG. 2, the filling machine 100 has a meat mincing machine 5, the said mincing machine can also have a corresponding heating/cooling device 8i.

The filling machine 100 comprises furthermore a machine controller 12, which comprises a closed-loop control device 6, which controls the temperature of the filling material in dependence of the temperatures measured by the temperature sensors 7. Moreover, the filling machine according to the disclosure comprises a device 10 for continuously documenting the measured temperatures with respect to time and location. A device of this nature for documentation can have a memory medium and/or an appropriate printer for printing out the measurement logs. With the embodiment illustrated in FIG. 1 the heating/cooling device 8 heats or cools the filling material in the sections 8a, 8b, 8c, wherein a common cooling or heating circuit is provided for these sections. This means that these sections are heated or cooled to a predetermined common temperature.

It is however also possible that the heating/cooling device has several mutually independent units 8a, b, c with cooling or heating circuits, separate from one another, which facilitates an even more exact adaptation of the temperature.

Due to the constructional circumstances the heating/cooling device 8d in the region of the suction intake section is separate from the regions 8a, b, c.

Moreover, the filling machine according to the disclosure can have a sensor for the measurement of the filling material pressure 9, as well as a device 15 for the measurement of the power consumption of the filling machine.

During production the filling material is subject to various temperature effects. These may be: dissipated heat from the filling machine, internal friction of the filling material as well as a temperature influence due to the room temperature. During the processing of certain types of filling material, e.g. raw sausage, it should however be noted that the temperature of the filling material should not exceed a certain temperature in the complete processing chain. During the processing of cheese, which is also filled into sausage casings, the filling material temperature, for example, must not fall below a certain temperature. In order to ensure this, following the method according to the disclosure, the temperature is measured by the temperature sensors 7 in several sections of the filling machine 100. In the closed-loop control device 6 the appropriate acquired temperature is then compared with a corresponding target value, which was previously entered in dependence of the product to be processed. The temperature of the filling material is then controlled to a certain temperature by the heating/cooling device 8 in dependence of the measured temperature, i.e. in dependence of the comparison of the target and sensed values. Due to the fact that the filling material temperature is measured in several sections and also automatic cooling or heating of the filling material occurs in several sections, the temperature of the mass flow can be maintained in an ideal manner without greater variations. Due to the integral closed-loop control circuit in the filling machine, the temperature of the mass flow during the complete dwell period within the filling machine can be monitored, controlled and optimised. Thus, even temperature-sensitive types of filling materials can be processed reliably.

It is also possible that the temperature of the filling material is set in dependence of the temperatures measured in the filling machine 100 before it is passed into the filling machine, in particular during the processing of paste mass. This has the advantage that the filling material, when it is passed into the hopper 1, already has a certain, previously set, suitable temperature, so that the heating/cooling device can quickly heat or cool the filling material to a certain target value range without large variations. To achieve this, the closed-loop control device 6 can, for example, be connected to a heating/cooling device, which heats or cools the filling material before it is passed into the filling machine. It is however also possible to show on a display, which is not shown, at which temperature or at which temperature range the filling material is to be brought before being passed into the filling machine.

According to the disclosure it is also possible to realise the temperature control predictively in dependence of certain parameters, wherein the cooling or heating power of the heating/cooling device 8 or its heating/refrigeration set 11 is controlled in dependence if these parameters. Thus, the cooling or heating power of the heating/cooling device can, for example, be controlled in dependence of the filling material pressure, which for example can be measured by a pressure measurement device 9 in the conveying mechanism 3. With a high filling material pressure substantial heating of the filling material due to internal friction must be expected so that, for example, the cooling power of the heating/cooling device 8 needs to be relatively high. The filling material pressure to be expected can however also be entered via an appropriate input unit. The cooling or heating power of the heating/cooling device 8 can also be controlled in dependence of the flow rate, wherein this can be similarly entered or measured. With a high flow rate, for example, more cooling must be provided than with a low flow rate, so that already at the start of the process the cooling or heating power can be controlled to an appropriate value. The temperature control can also be realised predictively in dependence of the power consumption of the filling machine, either expected or measured by the sensor 15, wherein the cooling or heating power from the heating/cooling device 8 is closed-loop controlled depending on the expected or measured power consumption. At a higher machine power the filling material heats up to a larger extent so that for example the cooling power needs to be high.

According to the disclosure, temperatures can thus be included, which are measured in a certain section or sections, for the temperature control in other sections.

Figure 3:
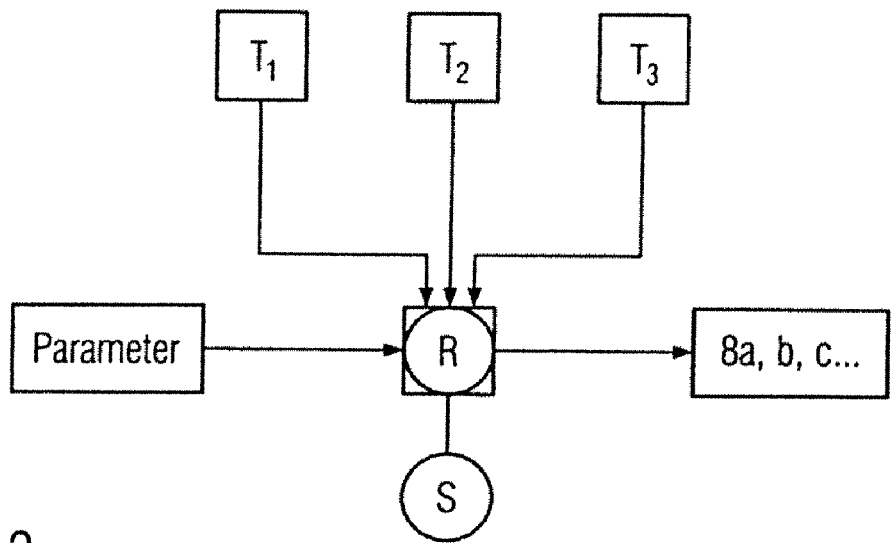
FIG. 3 illustrates schematically a functional block diagram of an embodiment of the method according to the disclosure.

FIG. 3 illustrates a possible functional block diagram for a method according to the disclosure. As emerges from FIG. 3, the measured temperature values, here just three temperature values as examples, are passed to the closed-loop control device 6. The measured temperatures are compared with corresponding target values S. As previously explained, the flow rate and/or the filling material pressure and/or the machine power can be included as further control parameters. The closed-loop control device 6 then controls the heating/cooling device 8 or its heating/refrigeration set 11. The cooling or heating device 8 then cools or heats the filling material to an appropriate target value or target value range. To achieve this for example, the temperature of the heat exchanger medium, the flow velocity, etc. can be adapted. In FIG. 3 there is a common heating/cooling circuit for the heating/cooling device 8 for the various sections of the filling machine 100.

Figure 4:
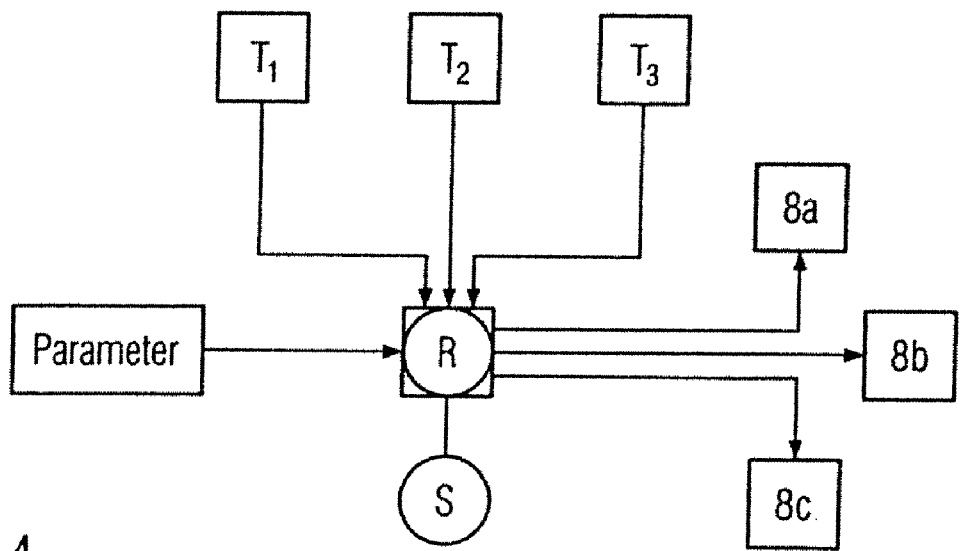
FIG. 4 illustrates schematically a functional block diagram of a further embodiment of the method according to the disclosure.

As illustrated in FIG. 4, it is however also possible to use separate heating/cooling circuits for the various units 8a, b, c, d of the heating/cooling device for the various sections. The temperature of the filling material can then be more exactly adjusted, wherein then, in sections in which the filling material is subject to larger temperature effects, correspondingly more or less heating or cooling can be provided. Thus unnecessarily large temperature variations can be prevented. The closed-loop control of the filling material temperature by the individual heating/cooling circuits is here realised in each case at least dependent on one measured temperature.

Also several, here three, mutually independent closed-loop control circuits, can be used for controlling the filling material temperature in the various sections. The various controllers then have their own target values. The corresponding units of the heating/cooling device 8 can then similarly be controlled differently.

Moreover, also several units, e.g. 8a, b, c as explained in FIG. 3, can have a common heating/cooling circuit, whereas one or several other units, e.g. 8d, have a separate heating/cooling circuit, as explained in FIG. 4.

Figure 5:
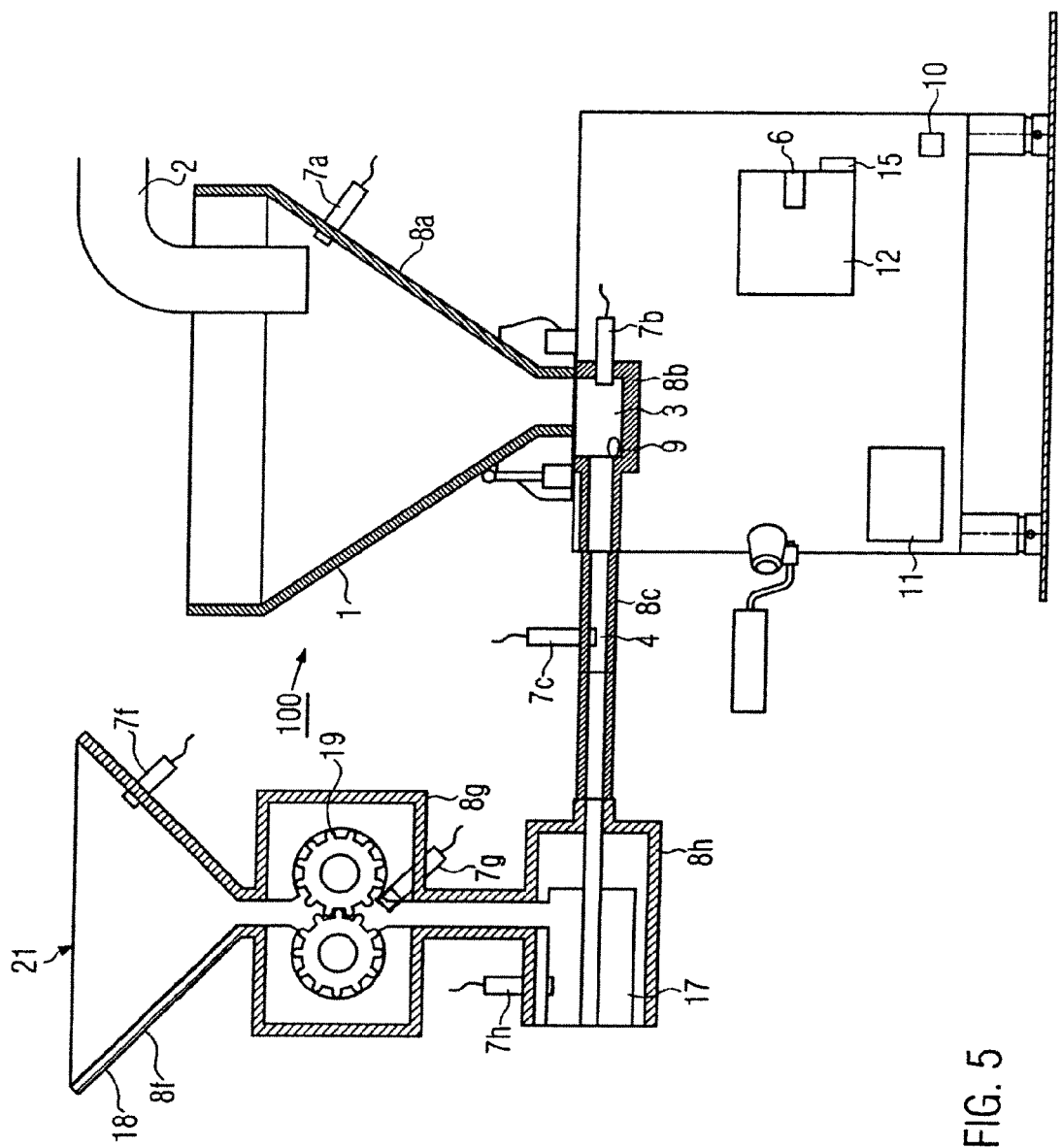
FIG. 5 shows schematically a further embodiment according to the disclosure.

FIG. 5 shows a further possible embodiment according to the disclosure. As emerges from FIG. 5, the filling machine has also a so-called coextrusion device 21. Coextrusion devices of this nature are used to eject a paste mass around the paste mass ejected from the filling tube 4. In this way, for example, a sausage casing can be applied to the filling material, or a second paste mass, i.e. a second filling material can be applied to the inner filling material ejected from the filling tube 4. A coextrusion device of this nature comprises in a familiar manner a device for feeding a paste mass, termed a coextrusion mass in the following. Here, the device 18 is formed as a filling hopper. Moreover, the coextrusion device 21 comprises a conveying mechanism 19, for example in the form of a vane pump or a gear pump. Finally, the coextrusion device 21 comprises a coextrusion head 17 for ejecting the coextrusion mass. Precisely as for the mass flow explained in connection with FIGS. 1 and 2, this coextrusion mass flow is influenced by the same parameters such as external temperature, dissipated heat from the filling machine, internal friction of the filling material, etc. For this reason the filling machine also has here one or several temperature sensors 7f, g, h for this mass flow in at least two of several sections, i.e. the filling hopper, conveying mechanism and coextrusion head. Also, the coextrusion device 21 has an appropriate heating/cooling device 8f, g, h in at least one of the various sections. As described in connection with the first mass flow, the filling machine in these sections can have separate heating/cooling devices with separate corresponding heating/cooling circuits 8f, g, h or one heating/cooling circuit for several sections. Otherwise this embodiment, which relates to the mass flow of the coextrusion mass, corresponds to the embodiment, which has been described in conjunction with the mass, which is ejected through the filling tube 4. This relates in particular also to the closed-loop control method illustrated in FIGS. 3 and 4, as well as to the predictive temperature control in dependence of the expected or measured power consumption of the filling machine or of the mass pressure measured in the conveying mechanism 19 or of the expected flow rate of the coextrusion mass.

With the embodiment illustrated in FIG. 5 the temperatures for the first mass flow and the coextrusion mass flow are controlled decoupled from one another, each to an appropriate target temperature. The control of the two different mass flows could however also take place in dependence of one another.

According to the disclosure it can be assured that during the complete filling process the appropriate temperature limits can be maintained without the operator having to intervene manually. Thus the process reliability can be significantly increased. The machine capacity can thus be increased through less downtime. The operating personnel is relieved and continuous documentation is possible.

The invention claimed is:

1. Method for the temperature control of at least one mass flow in a filling machine for the manufacture of sausages, comprising passing the mass flow through several sections of a filling machine, measuring, in the several sections of the filling machine, the temperature of the mass or of components through which the mass flows, controlling the temperature of the mass by a heating/cooling device to a certain temperature in dependence of the measured temperatures and at least measuring the temperature in one of a section of a filling hopper, a suction intake section, and in or after a conveying mechanism.

2. Method according to claim 1, and measuring the temperature in or after a meat mincing machine, which is arranged after the conveying mechanism.

3. Method according to claim 1, and controlling the temperature of the mass in one or several sections of the filling machine to a certain temperature.

4. Method according to claim 3, and controlling the temperature of the mass in or at one of the hopper, on the conveying mechanism, at a meat mincing machine, at the filling tube, in or at the suction intake section, or a combination thereof, with the aid of the heating/cooling device.

5. Method according to claim 3, and providing the temperature control in the individual sections through one of a common heating/cooling circuit or through at least two separate heating/cooling circuits.

6. Method according to claim 1, and setting the temperature of the mass in dependence of the temperature measured in the filling machine before it is passed into the filling machine.

7. Method according to claim 6, and setting the temperature of the mass in dependence on the temperature measured in the mass during preparation of the paste mass.

8. Method according to claim 1, and causing the temperature control to predictively occur in dependence of one of the expected or measured mass flow rate, wherein the cooling or heating power from the heating/cooling device is controlled depending on the flow rate.

9. Method according to claim 1, and causing the temperature control to predictively occur in dependence of one of the expected or measured mass pressure, wherein the cooling or heating power from the heating/cooling device is controlled depending on the mass pressure.

10. Method according to claim 1, and causing the temperature control to predictively occur in dependence of one of the expected or measured power consumption of the filling machine, wherein the cooling or heating power from the heating/cooling device is controlled depending on one of the expected or measured power consumption.

11. Method according to claim 1, wherein the mass flow is a coextrusion mass flow, and measuring the temperature in one of a section of a coextrusion mass intake, a section of a coextrusion conveying mechanism, a section of a coextrusion head, or a combination thereof.

12. Method according to claim 11, and controlling the temperature of the mass at one of the coextrusion mass intake, the coextrusion conveying mechanism, the coextrusion head, or a combination thereof, via the heating/cooling device.

13. Method according to claim 1, and documenting the measured temperatures with respect to time and location.

14. Filling machine for the manufacture of sausages from at least one paste mass, which passes through several appropriate sections, comprising a suction intake section, a filling hopper, a conveying mechanism, a filling tube, one or several temperature sensors, which are arranged in various sections of the filling machine, a heating/cooling device for heating or cooling the mass, and a control device, which controls the temperature of the mass in dependence of the measured temperatures wherein the temperature sensor or the temperature sensors are arranged such temperature is measured in one of a certain section or certain sections of the filling machine and the control device is designed such that the measured temperature is used for the temperature control in one of a different section or different sections.

15. Filling machine according to claim 14, wherein the heating/cooling device is at least partially arranged one of at or in the filling hopper, at the conveying mechanism, at the filling tube, at the suction intake section, or a combination thereof.

16. Filling machine according to claim 14, wherein the filling machine also comprises a meat mincing machine, and the heating/cooling device is at least partially arranged around the meat mincing machine.

17. Filling machine according to claim 14, and the temperature sensors are arranged at least in one of a section of the filling hopper, the suction intake section, and in or after the conveying mechanism .

18. Filling machine according to claim 14, wherein the heating/cooling device heats or cools the filling machine at one or several sections and has a common cooling or heating circuit for these sections.

19. Filling machine according to claim 14, wherein the heating/cooling device has several independent units with separate cooling or heating circuits.

20. Filling machine according to claim 14, wherein the device also comprises a coextrusion device, which comprises several sections, and the temperature sensors are arranged in several sections of the coextrusion device.

21. Filling machine according to claim 20, wherein the heating/cooling device is arranged at one of the coextrusion mass intake, the coextrusion conveying mechanism, the coextrusion head, or a combination thereof.

22. Filling machine according to claim 20, wherein the several sections comprise at least one of a coextrusion mass intake, a conveying mechanism, and a coextrusion head.

23. Filling machine according to claim 14, wherein the filling machine comprises a device for continuously documenting the measured temperatures with respect to time and location.

* * * * *